(12) United States Patent
Bhatt (10) Patent No.: US 9,639,147 B2
(45) Date of Patent: *May 2, 2017

(54) HEADS-UP-DISPLAY FOR USE IN A MEDIA MANIPULATION OPERATION

(71) Applicant: Apple Inc., Cupertino, CA (US)

(72) Inventor: Nikhil Mahesh Bhatt, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 233 days.

This patent is subject to a terminal disclaimer.

(21) Appl. No.: 13/666,599

(22) Filed: Nov. 1, 2012

(65) Prior Publication Data

US 2013/0159860 A1 Jun. 20, 2013

Related U.S. Application Data

(63) Continuation of application No. 11/862,148, filed on Sep. 26, 2007, now Pat. No. 8,307,287.

(Continued)

(51) Int. Cl.
*G06F 3/0481* (2013.01)
*G06F 3/0484* (2013.01)
(Continued)

(52) U.S. Cl.
CPC ............. *G06F 3/01* (2013.01); *G06F 3/0481* (2013.01); *G06F 3/0484* (2013.01);
(Continued)

(58) Field of Classification Search
CPC ..... G11B 27/031; G11B 27/034; G11B 27/34; G11B 27/029; G11B 27/036;
(Continued)

(56) References Cited

U.S. PATENT DOCUMENTS 5,467,288 A * 11/1995 Fasciano et al. ............. 715/716
5,732,184 A * 3/1998 Chao et al. ................... 386/282
(Continued)

OTHER PUBLICATIONS

"U.S. Appl. No. 11/862,148, Examiner Interview Summary mailed Jun. 14, 2011", 4 pgs.

(Continued)

*Primary Examiner* — Kieu Vu
*Assistant Examiner* — Blaine Basom
(74) *Attorney, Agent, or Firm* — Chia-Hsin Chu; Page Ponsford; DLA Piper LLP US (57) ABSTRACT

Techniques are provided for generating a heads-up-display to assist users during performance of media manipulation operations. According to one embodiment, a transient heads-up-display is displayed during a media manipulation operation to assist the user in the media manipulation operation. The heads-up-display may, for example, depict three frames of a video clip when an audio clip is being positioned, on a timeline, relative to the video clip. The three frames that are depicted in the heads-up-display may be the frames located at the current starting position, cursor position, and ending position, of the audio clip. As the audio clip is being moved during the positioning operation, the three frames depicted in the heads-up-display change accordingly.

19 Claims, 2 Drawing Sheets

Related U.S. Application Data (60) Provisional application No. 60/923,228, filed on Apr. 13, 2007.

(51) Int. Cl.

| | | |
|---|---|---|
| *G11B 27/031* | (2006.01) | |
| *G11B 27/036* | (2006.01) | |
| *G06F 3/01* | (2006.01) | |
| *G11B 27/10* | (2006.01) | |
| *G11B 27/34* | (2006.01) | |

(52) U.S. Cl.
CPC .......... *G11B 27/031* (2013.01); *G11B 27/036* (2013.01); *G11B 27/10* (2013.01); *G11B 27/34* (2013.01)

(58) Field of Classification Search
CPC .. G06F 3/0486; G06F 3/0484; G06F 3/04845; G06F 3/0481
USPC .......................... 715/723, 724, 726; 386/282
See application file for complete search history.

(56) References Cited

U.S. PATENT DOCUMENTS

| | | | |
|---|---|---|---|
| 5,999,173 A | 12/1999 | Ubillos | |
| 6,154,601 A | 11/2000 | Yaegashi et al. | |
| 6,185,538 B1* | 2/2001 | Schulz | 704/278 |
| 6,597,375 B1 | 7/2003 | Yawitz | |
| 6,778,223 B2* | 8/2004 | Abe | G11B 27/002 345/473 |
| 7,124,366 B2* | 10/2006 | Foreman | G06F 3/0483 375/E7.026 |
| 7,395,515 B2 | 7/2008 | Konar et al. | |
| 7,945,142 B2* | 5/2011 | Finkelstein et al. | 386/285 |
| 8,307,287 B2 | 11/2012 | Bhatt | |
| 2002/0149612 A1* | 10/2002 | Malamud | G06F 3/0481 715/711 |
| 2005/0257152 A1* | 11/2005 | Shimizu | G11B 27/34 715/723 |
| 2008/0256449 A1 | 10/2008 | Bhatt | |

OTHER PUBLICATIONS

"U.S. Appl. No. 11/862,148, Examiner Interview Summary mailed Dec. 21, 2011", 3 pgs.

"U.S. Appl. No. 11/862,148, Final Office Action mailed Mar. 8, 2012", 9 pgs.

"U.S. Appl. No. 11/862,148, Final Office Action mailed Mar. 15, 2011", 23 pgs.

"U.S. Appl. No. 11/862,148, Non Final Office Action mailed Sep. 15, 2010", 17 pgs.

"U.S. Appl. No. 11/862,148, Non Final Office Action mailed Sep. 23, 2011", 18 pgs.

"U.S. Appl. No. 11/862,148, Notice of Allowance mailed Jun. 29, 2012", 5 pgs.

"U.S. Appl. No. 11/862,148, Response filed Jun. 3, 2011 to Final Office Action mailed Mar. 15, 2011", 21 pgs.

"U.S. Appl. No. 11/862,148, Response filed Jun. 8, 2011 to Final Office Action mailed Mar. 8, 2012", 14 pgs.

"U.S. Appl. No. 11/862,148, Response filed Dec. 14, 2011 to Non Final Office Action mailed Sep. 23, 2010", 22 pgs.

"U.S. Appl. No. 11/862,148, Response filed Dec. 15, 2010 to Non Final Office Action mailed Sep. 15, 2010", 19 pgs.

Alper, N., et al., "Geospatial metadata querying and visualization on the WWW using JavaTM applets", Proceedings IEEE Symposium on Information Visualization '96, (Oct. 1996), 77-84, 128.

Tanin, E., et al., "Design and evaluation of incremental data structures and algorithms for dynamic query interfaces", IEEE Symposium on Information Visualization, 1997. Proceedings, (Oct. 1997), 81-86.

\* cited by examiner

HEADS-UP-DISPLAY FOR USE IN A MEDIA MANIPULATION OPERATION

PRIORITY CLAIM

The present application is a continuation of and claims the benefit of priority to U.S. application Ser. No. 11/862,148, filed on Sep. 26, 2007, which claims the benefit of priority to Provisional Application No. 60/923,228, filed on Apr. 13, 2007, the benefit of priority of each of which is claimed hereby, and each of which is incorporated by reference herein its entirety.

FIELD OF THE INVENTION

The present invention relates to media manipulation operations and more specifically, to operations that manipulate media items relative to a timeline with which one or more other media items are associated.

BACKGROUND

Many software applications exist that allow users to perform operations on media items, such as video clips and sound clips. Those applications often generate a user interface display that includes a timeline, and provide tools that allow users to position media items along the timeline.

For example, a user may add a video clip to a timeline, where the start of the video clip corresponds to time T1 and the end of the video clip corresponds to time T500. Once the video clip has been placed on the timeline, a user may wish to place an audio clip along the same timeline. In many cases, the quality of the final product being created by the user may hinge on the accuracy of the placement of the audio.

To assist the user in selecting where to place the audio clip, the software application may include, within the layout of the timeline display screen, a video window and a playhead control. The video window displays a video frame of the video clip. The specific video frame that is displayed is determined by the position of the playhead control. Typically, the software application would allow the user to move the playhead control along the displayed timeline. As the playhead control is moved along the timeline, the video window displays the video frame of the video clip that corresponds to the current position of the playhead control.

By watching the video window while moving the playhead control, a user may identify a video frame at which the audio clip should start. The user may then place the start of the audio-clip at the position of the playhead control in the timeline, to ensure that the audio clip will start playing at the frame currently displayed in the video window.

If it is important for an audio clip to end at a particular frame in the video, then the user may find the appropriate frame by moving the playhead control while watching the video window, and then position the audio clip on the timeline so that the audio clip ends at the current position of the playhead control.

Unfortunately, the process of first positioning the playhead, and then positioning a media clip based on the playhead, is cumbersome. Consequently, some software applications include a feature that allows users to place media items, based on the video window, without first positioning the playhead. Specifically, while a user is positioning an audio clip on a timeline, some applications cause the video window to display the video frame that corresponds to the current position of the start of the audio clip, regardless of the current position of the playhead. By watching the video window while moving the audio clip along the timeline, the user can pick the exact video frame for the start of the audio.

Unfortunately, causing the video window to display the video frame that corresponds to the start of the audio clip may not provide sufficient information to the user. For example, a user that is concerned about the video frame that corresponds to the end of the audio clip will not be helped by seeing the video frame that corresponds to the start of the audio clip. Further, it is rather cumbersome to be placing a video clip along a timeline on one part of the display, while trying to watch the video frames that are being shown in another part of the display. The correct placement of media clips along a timeline is made even mote difficult by the fact that the video windows in timeline interfaces are often very small (to allow more room for the other aspects of the timeline interface), and may be visually distant from the timeline on which the media clip is being placed. To increase the size of the video window, users often display the video window on one screen, and the other components of the timeline interface on another screen.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may foe practiced without these specific details. In other instances, well-known structures and devices are shown in block diagram form in order to avoid unnecessarily obscuring the present invention.

Overview

Techniques are described hereafter for generating a heads-up-display to assist users during performance of media manipulation operations. Typically, a heads-op-display takes the form of a small floating window with task-specific controls. According to one embodiment, a transient heads-up-display is displayed during a media manipulation operation to assist the user in the media manipulation operation. For example, in one embodiment, the heads-up-display depicts three frames of a video clip when an audio clip is being positioned relative to the video clip. The three frames that are depicted in the heads-up-display are the frames located at the current starting position, cursor position, and ending position, of the audio clip. As the audio clip is being moved during the positioning operation, the three frames depicted in the heads-up-display change accordingly.

For interfaces that include a video window, the user need not repeatedly check the video window during the media manipulation operation, because the frames depleted in the heads-up-display provide the Information necessary for the user to accurately position media clips relative to other media clips. Thus, the video window may, for example, remain unchanged during a media manipulation operation. For example, rise video window may continue to display the frame of a video clip that corresponds to the current playhead position.

Further, in embodiments where the heads-up-display is generated temporarily during the media manipulation operation, the heads-up-display may be larger than would otherwise be practical if the display were a non-transient component of the user interface. A large heads-up-display may temporarily obscure other features of the interface during the media manipulation operation. However, in response to completion of the media manipulation operation, the heads-up-display disappears, allowing those features to be fully visible.

In one embodiment, the heads-up-display tracks the user's cursor during the media manipulation operation. Because the heads-up-display remains near the user's cursor as the user moves the cursor during the media manipulation operation, the user need not repeatedly move her eyes between the cursor (which is positioning the clip), and the heads-up display.

Generating a three-frame heads-up-display during the placement of an audio clip relative to a video clip is merely one example of how the techniques described herein may be employed during media manipulation operations. Many additional examples shall be given hereafter.

There are numerous advantages to a heads-up-display over the conventional approach, of reusing the video window to assist a user during a media manipulation operation. For example, often in audio, the video window is small to leave more room for the timeline. A transient heads-up-display can be made much larger. With a larger heads-up-display, the heads-up-display can accommodate, multiple frames of video without losing detail.

In one embodiment, heads-up-displays are translucent. Consequently, the timeline (and other non-transient components of the timeline interface) would still appear below the heads-up-display, so less context is obscured.

By keeping the heads-up-display near the cursor, user can stay focused on the cursor area, instead of switching between the mouse area and the video window (which may be far away on a large screen).

Example Heads-Up-Display Display

Figure 1:
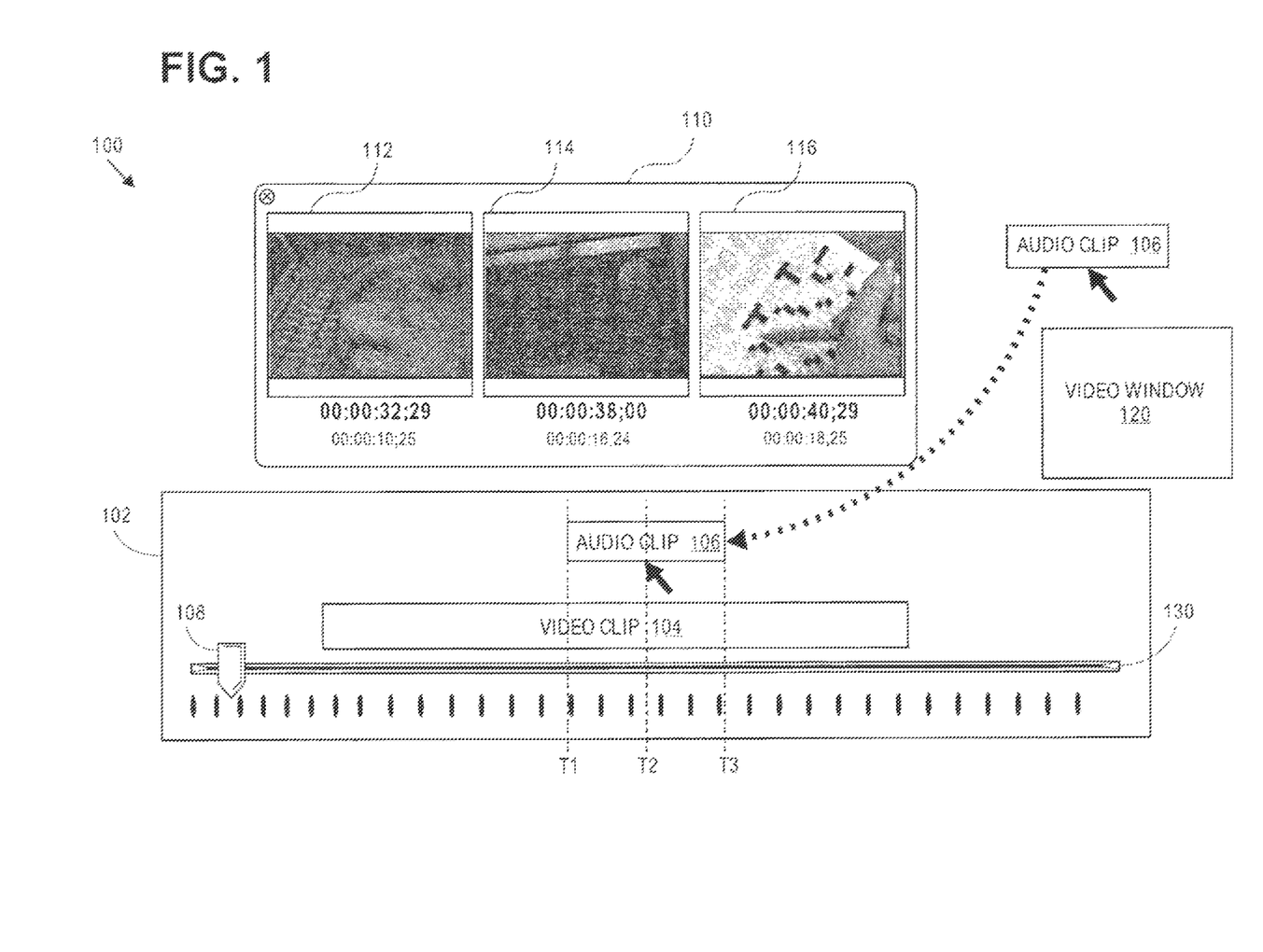
FIG. 1 is a block diagram that illustrates a heads up display that is generated to assist with media manipulation operations, according to an embodiment of the invention.

Referring to FIG. 1, it illustrates an interface 100 that includes a heads-up-display 110, according to an embodiment of the invention. During a media manipulation operation, heads-up-display 110 appears near the cursor, and moves intelligently as needed. Preferably, the heads-up-display 110 tracks near the mouse at all times.

The specific media manipulation operation illustrated in FIG. 1 is the placement of an audio clip 106 onto timeline interface 102. The media item whose timeline position is affected by the media operation is referred to herein as the "target media item". Thus, in the media manipulation operation illustrated in FIG. 1, audio clip 106 is the target media item.

During the placement of audio clip 106, the heads-up-display 110 displays frames from a video clip 104 that has been positioned along a timeline 130 of a timeline control 102. For the purpose of explanation, video clip 104 shall be referred, to herein as an "in-place" media item, since the media manipulation operation does not affect the position of video clip 104 along the timeline 130.

It should be noted that, while FIG. 1 only shows one video clip on the timeline 130, there may be any number of video clips (A, B, . . . N) on the timeline 130. Under these circumstances, the heads-up-display may display the correct frame(s) from, the appropriate video clip. Alternatively, the heads-up-display may also display frames from multiple video clips at a single time. For example, the heads-up-display may composite the clips to provide a video display matching what is seen in the viewer.

In the illustrated embodiment, heads-up-display 110 has three frames 112, 114, and 116 from video clip 104, and also includes time-codes that indicate times associated with the depicted frames. The first frame 112 depicts the video frame of in-place video clip 104 that corresponds to time T1 on timeline 130. The video frame that corresponds to time T1 is depicted because the start of audio clip 106 currently coincides with time T1. Thus, if the user were to place audio clip 100 at the position shown in FIG. 1, playback of the audio clip would begin at the same time that video frame 112 of in-place video clip 104 is displayed.

In the illustrated embodiment, the second frame 114 depicts the video frame of in-place video clip 104 that corresponds to time T2 on timeline 130. The video frame that, corresponds to time T2 is depicted because the cursor that is being used to position audio clip 106 is currently at time T2.

In the illustrated embodiment, the third frame 116 depicts the video frame of in-place video clip 104 that corresponds to time T3 on timeline 130. The video frame that corresponds to time T3 is depleted because the end of audio clip 106 currently coincides with time T3. Thus, if the user were to place audio clip 106 at the position shown in FIG. 1, playback of the audio clip 106 would end at the same time that video frame 116 of in-place video clip 104 is displayed.

Interface 100 also includes a video window 120 and a playhead 108. Video window 120 is a non-transient component of interface 110. In one embodiment, video window 120 continues to display the frame of in-place video clip 104 that corresponds to the current position of playhead 108.

According to one embodiment illustrated, the heads-up-display is a translucent window which shows multiple frames of video when the user is doing certain actions in the timeline interface 100. Each frame of video illustrated in the heads-up-display is labeled with its timecode. The heads-up-display intelligently tracks the mouse cursor. While intelligently tracking the mouse cursor, the heads-up-display may not necessarily move every time the cursor moves, but it will always remain near the cursor.

The heads-up-display automatically shows and hides based on whether the user is performing certain scrubbing operations, in one embodiment, the user is also able to explicitly dismiss the heads-up-display.

Typically, a timeline interface such as interface 100 illustrated in FIG. 1 is used to show all media items that belong to a "project". If the project does not currently contain video, then there will not be any in-place video clip. According to one embodiment, when no in-place video clip is present, the heads-up-display may still be used, to show timecodes that correspond, to the start and end of the target media, as well as a timecode associated, with the current cursor position.

Sync Points and Clip Markers

Sync points are pre-established points of interest within a file. For Example, in an audio clip of a gunshot, it may be important to know where, within the audio clip, that the gun is actually fired. To assist users, the creator of the audio clip may embed metadata within the clip that establishes the firing-location as a sync point. A media clip may have any number of creator-established sync points, all of which may be identified by metadata embedded in the clip, or metadata maintained external to the clip. In some embodiment, end-users are provided a mechanism by which they may add sync points to a media item. The mechanism may update the file of the media item itself, or maintain the metadata or user-defined sync points external to the file.

Clip markers are user specified points in a clip. Clip markers are often used to attach notes, or to synchronize other clips to the clips that have the clip markers. Clip markers are different than sync points, which are file-specific. A clip is a starting and ending point pair for a file (from time 'x' to time 'y'), and there may be multiple clips in a timeline for a given file.

As shall be described in greater detail hereafter, the presence of sync points and/or clip markers a target media item may affect the contents of the heads-up-display that is shown during a media manipulation operation.

Uses of Heads-Up-Displays During Media Manipulation

As mentioned above, the placement of an audio clip on a timeline on which a video clip has already been positioned is merely one example of how a heads-up-display may be used during a media manipulation operation. Other examples that are also within the scope of the present invention include:

MAKING A SELECTION IN A TIMELINE: When a selection of an in-place media item is created (timeslice or other), a two point heads-up-display is generated, where the heads-up-display shows the starting and ending frames of the portion that is currently selected to help users make the selection.

In one embodiment, when the user creates a selection marquee or timeslice a 2 frame heads-op-display is displayed which, shows the video frame at the start of the selection and the video frame at the end of the selection. If the user is making the selection with the mouse, the heads-up-display will close when the user lets go of the mouse button. If the user is modifying the selection using Three Point Selection scrubbers, the heads-up-display will appear when the user clicks in one of the scrubbers and will, close after there have been no changes to the selection for a short time.

DRAGGING A CLIP INTO A TIMELINE: When a clip enters the timeline, the heads-up-display appears and shows at least three frames. The first frame corresponds to the start of the clip, and the third frame corresponds to the end of the clip. The middle frame may be either a) a sync point in the file, b) a clip marker or c) the cursor position. In some embodiments, more than three frames are displayed in the heads-up-display. For example, the heads-up-display may include frames for each of multiple markers or sync points. When a clip leaves the timeline, the heads-up-display disappears.

Specifically, in one embodiment, when the user drags a new clip into the timeline, a heads-up-display will be displayed with at least two video frames. The first frame will, be for the start of the clip and the last frame for the end of the clip. The middle frames would be for any sync points that have been added to the file. When the clip leaves the timeline area or the user lets go of the mouse button, the heads-up-display automatically disappears.

DRAGGING A CLIP AROUND THE TIMELINE: In one embodiment, when the user drags an already existing clip around the timeline, a heads-up-display is displayed with at least 2 video frames. The first frame is for the start of the clip and the last frame is for the end of the clip. The middle frame(s) are far any sync points or clip markers that have been added to the clip. A clip could have many markers and sync points. Thus, how many and which frames to show may vary from implementation to implementation. When the user lets go of the mouse button, the heads-up-display automatically closes. In the case of dragging multiple clips, the first frame of video would be from the leading edge of the earliest clip in time and the last frame of video would be for the trailing edge of the last clip in time. The middle frame corresponds to the current cursor position.

RESIZING A CLIP IN THE TIMELINE: When clips are resized, only one point is changing (the start or the end). Thus, during resizing, the heads-up-display may display frame information around that changing point, rather than frames of both edges. Alternatively, when the user resizes a clip in the timeline, a heads-up-display is displayed with two video frames (one for each edge of the clip). As the user resizes one edge of the clip, that frame will update. In one embodiment, when clips are dragged, a single frame heads-up-display is displayed at the cursor while the user is performing the dragging operation.

TIME STRETCHING A SELECTION: When time stretching a selection, a single frame heads-up-display is displayed at the cursor while the user is dragging. The frame illustrated, in the heads-up-display is the frame, of the in-place media item, that corresponds to the current position of the cursor that is performing the dragging operation.

For example, when the user uses a Time Stretch Tool, a heads-up-display is displayed with a single frame of video that follows the cursor location. When the user lets go of the mouse button, the heads-up-display closes.

USING NUDGE KEYS TO MOVE A CLIP: When using nudge keys to move a clip, a two frame heads-up-display is generated, whom the first frame is the in-place media item frame that corresponds to the start of the target clip, and the second frame is the in-place media item frame that corresponds to the end of the target clip.

In one embodiment, when the nudge keys are used to move a clip, a heads-up-display with a frame for the beginning and end of the clip are displayed. If multiple clips are selected, the frames are for the beginning of the left most clip and end of the right most clip.

HORIZONTALLY MOVING ENVELOPE POINT: An envelope point is similar to a keyframe in video. Specifically, an envelop point is a specific point, set by the user, on a parameter automation curve (e.g., a volume curve which adjusts the volume of the track or clip over time). Users often place envelope points to synchronize to a specific event in audio or video. In one embodiment, when the user moves an envelope point horizontally, a heads-up-display will be displayed which shows the current envelope point position. If multiple envelope points are selected, two or three frames a shown: one for the first envelope point, one for the last envelope point, and one for the envelope point being dragged if it is not the first or last point.

DRAGGING MARKERS: A marker is a point on the timeline that the user wishes saved (like a clip marker). These often need to be synchronized to specific events in audio or video. According to one embodiment, a one-frame heads-up-display is shown when a user drags a single marker. A two-frame heads-up-display is shown when dragging two markers. A three-frame heads-up-display should be shown when dragging three or more markers. In this case the first marker, the marker being dragged, and the last marker are the video frames that get shown.

Displaying and Hiding the Head-Up-Display

According to one embodiment, the heads-up-display is transient, automatically being displayed in response to the initiation of a media manipulation operation, and automatically being hidden at the conclusion of the media manipulation operation. In some embodiment, the user may be provided additional ways to control, the display and hiding of the heads-up-display.

For example, in one embodiment, if the heads-up-display gets in the way, the user could dismiss it via a gesture. One gesture that may be used for this purpose (with a mouse or pen) is a quick, diagonal motion over a short distance (a "flick"). The occurrence of a flick, can be detected by calculating the acceleration of the cursor (change in velocity over time), using a small distance and small time as constraints. In such an embodiment, the heads-up-display would be dismissed when the mouse moved suddenly and sharply over a short distance and time.

In one embodiment tapping a specified key brings up the heads-up-display. Once displayed, tapping the specified key again will hide the heads-up-display. In one embodiment, pressing a designated key for more than a predetermined time will cause the heads-up-display to be displayed as long as the user continues to press the designated key. As soon as the user releases the designated key after pressing the designated key, the heads-up-display is hidden. Thus, if the initial key press duration is less than a predetermined duration, the heads-up-display may continue to be displayed after release of the key, but if the initial key press duration is greater than the predetermined duration, the heads-up-display may be hidden in response to release of the key.

In one embodiment, the heads-up-display has two operation modes: automatic and manual. In automatic mode, the heads-up-display appears and disappears based on actions the user is performing in the timeline. In automatic mode, the heads-up-display intelligently tracks the mouse.

In manual mode, the user must explicitly bring up the heads-up-display using the Window menu, a key command, or some other explicit user input. When displayed manually, the heads-up-display may appear as a window with a standard close box. The user can move the window anywhere on the screen. In one embodiment, the heads-up-display does not track the mouse when in manual mode.

Hardware Overview

Figure 2:
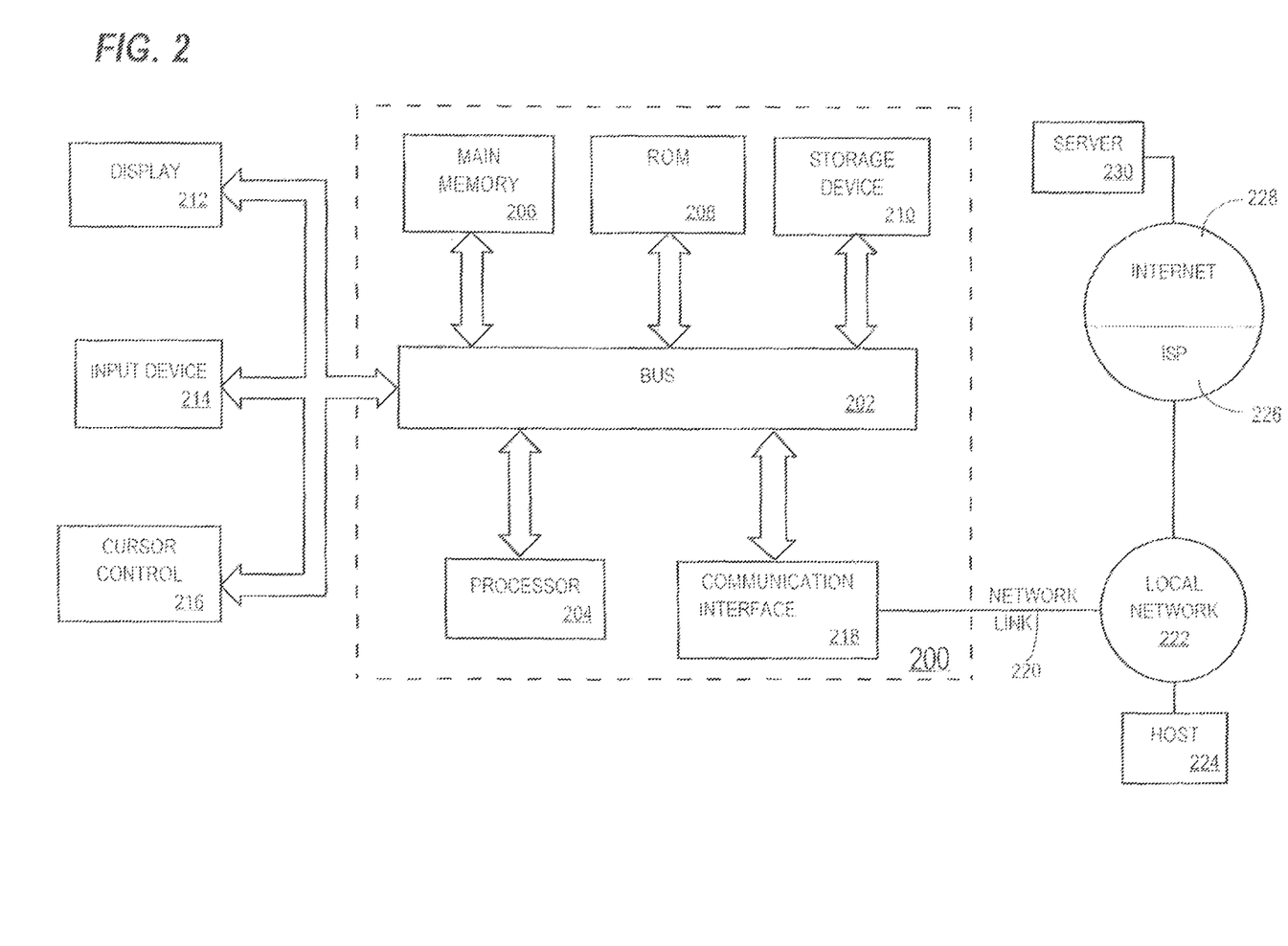
FIG. 2 is a block diagram of a computer system upon which embodiments of the invention may be implemented.

FIG. 2 is a block diagram, that illustrates a computer system 200 upon which an embodiment of the invention may be implemented. Computer system 200 includes a has 202 or other communication mechanism for communicating information, and a processor 204 coupled with bus 202 for processing information. Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

The invention is related to the use of computer system 200 for implementing the techniques described herein. According to one embodiment of the invention, those techniques are performed by computer system 200 in response to processor 204 executing one or more sequences of one or more instructions contained in main memory 206. Such instructions may be read into main memory 206 from another machine-readable medium, such as storage device 210. Execution of the sequences of instructions contained in main memory 206 causes processor 204 to perform the process steps described herein. In alternative embodiments, hardwired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion, in an embodiment implemented using computer system 200, various machine-readable media are involved, for example, in providing instructions to processor 204 for execution. Such a medium may take many forms, including but not limited to storage media and transmission media. Storage media includes both non-volatile media and volatile media. Non-volatile media includes, for example, optical or magnetic-disks, such as storage device 210. Volatile media includes-dynamic memory, such as main memory 206. Transmission media includes coaxial cables, copper wire and fiber optics, including the wires that comprise bus 202. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM any other optical medium, punchcards, papertape, any other physical medium with patterns of holes, a RAM, a PROM, and EPROM, a FLASH-EPROM any other memory chip or cartridge, a earner wave as described hereinafter, or any other medium from which a computer can read.

Various forms of machine-readable media may be involved in carrying one or more sequences of one or more instructions to processor 204 for execution. For example, the instructions may initially be carried, on a magnetic disk of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data, carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interlace 218 may be an integrated services digital network (ISDN) card or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication, services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are exemplary forms of carrier waves transporting the information.

Computer system 200 can send messages and receive data. Including program code, through the network(s), network link 220 and communication interface 218. In the Internet example, a server 230 might transmit a requested code for an application program through Internet 228, ISP 226, local network 222 and communications interface 218.

The received code may be executed by processor 204 as it is received, and/or stored in storage device 210, or other non-volatile storage for later execution. In this manner, computer system 200 may obtain application code in the form of a carrier wave.

In the foregoing specification, embodiments of the invention, have been described with reference to numerous specific details that may vary from implementation to implementation. Thus, the sole and exclusive indicator of what is the invention, and is intended by the applicants to be the invention, is the set of claims that issue from this application, in the specific form, in which such claims issue, including any subsequent correction. Any definitions expressly set forth herein for terms contained in such claims shall govern the meaning of such terms as used in the claims. Hence, no limitation, element, property, feature, advantage or attribute that is not expressly melted in a claim should limit the scope of such claim in any way. The specification and drawings are, accordingly, to be regarded in an illustrative rather than a restrictive sense.

What is claimed is:

1. A method of manipulating digital media, the method comprising:
   receiving, by a computing device, user input manipulating a position of a digital audio clip that causes the computing device to change the position of the digital audio clip relative to a digital video clip along a timeline, the digital video clip comprising a plurality of frames, and wherein the digital audio clip and the digital video clip are both repositionable along the timeline;
   in response to receiving the user input, generating, for display, a heads-up-display that visually depicts, concurrently:
      a first frame of the video clip, wherein the first frame occurs at a first time on the timeline; and
      a second frame of the video clip, wherein the second frame occurs at a second time on the timeline; wherein the computing device is configured to select the first frame and the second frame for display relative to the position of the audio clip and regardless of the position of any cursor associated with the received user input.

2. The method of claim 1, wherein the first time corresponds to a current start time of the audio clip on the timeline, and wherein the second time corresponds to a current end time of the audio clip on the timeline.

3. The method of claim 2, wherein generating, for display, the heads-up-display comprises:
   automatically selecting, by the computing device, the first frame, from the plurality of frames of the video clip, based on the first frame being temporally aligned with the current start time of the audio clip; and
   automatically selecting, by the computing device, the second frame, from the plurality of frames of the video clip, based on the second frame being temporally aligned with the current end time of the audio clip.

4. The method of claim 1, further comprising generating, or display, a visual representation of the audio clip that includes a start and an end.

5. The method of claim 4, wherein a location of the visual representation of the audio clip, relative to the timeline, determines when playback of the audio clip will start and end relative to the video clip, wherein the received user input is configured to cause the computing device to move the location of the visual representation of the audio clip relative to the timeline, and wherein the video clip has a playback time, relative to the timeline, that does not change in response to the received user input.

6. The method of claim 1, further comprising:
   tracking, while receiving the user input, a cursor position relative to the video clip; and
   generating, for display within the heads-up display, a third frame of the video clip corresponding to the cursor position.

7. The method of claim 1, wherein the audio clip includes one or more sync points, and wherein generating, for display, the heads-up-display comprises, for each sync point of the one or more sync points, generating, for display, a frame of the video clip that occurs at a time that currently corresponds to where the sync point aligns with the timeline.

8. The method of claim 1, wherein the audio clip includes one or more clip markers, and wherein generating, for display, the heads-up-display comprises, for each clip marker of the one or more clip markers, generating, for display, a frame of the video clip that occurs at a time that currently corresponds to where the clip marker aligns with the timeline.

9. The method of claim 1, further comprising:
receiving, by the computing device, an indication that the user input is no longer being received; and
automatically hiding, by the computing device, the heads-up-display in response to the received indication that the user input is no longer being received.

10. A method comprising:
generating, for display, a timeline depicting running time associated with media clips displayed within a user interface, wherein the media clips are repositionable along the timeline;
generating, for display, a video display window displaying a video frame representing the media clips at a current position of a playhead in the timeline display; and
generating, for display, a transient heads-up display window overlaid on the user interface in response to a user input manipulating a position of a target media clip of the media clips displayed within the user interface to change a time over which the target media clip will occur relative to the timeline, the transient heads-up display graphically depicting information representing a plurality of temporal locations within the target media clip regardless of a position on the display associated with the user input; and
wherein the heads-up display window graphically depicts frames of a target video clip, of the media clips displayed within the user interface, at a plurality of temporal locations within the target video clip, and the heads-up display window visually depicting at least:
a first frame of the target video clip, wherein the first frame occurs at a first temporal location within the target video clip corresponding to a first temporal location associated with the media clip; and
a second frame of the target video clip, wherein the second frame occurs at a second temporal location within the target video clip corresponding to a second temporal location associated with the media clip.

11. The method of claim 10, wherein generating, for display, the transient heads-up display window comprises generating, for display, the transient heads-up display window such that the transient heads-up display window, when displayed, obscures at least a portion of the user interface.

12. The method of claim 10, wherein the first temporal location associated with the media clip corresponds to a current start time of the media dip on the timeline, and wherein the second temporal location associated with the media clip corresponds to a current end time of the media clip on the timeline.

13. The method of claim 10, wherein the media clip comprises at least one of a video clip and an audio clip.

14. The method of claim 10, further comprising:
tracking, while receiving the user input, a cursor position relative to the target video clip; and
generating, for display within the heads-up display window, a third frame of the target video clip corresponding to the cursor position.

15. The method of claim 10, further comprising:
receiving an indication that the user input is no longer being received; and
automatically hiding the heads-up display window in response to the received indication that the user input is no longer being received.

16. A system comprising:
at least one processor; and
a computer-readable medium storing one or more sequences of instructions which, when executed by the at least one processor, causes:
generating, for display, a timeline depicting running time associated with media clips displayed within a user interface, wherein the media clips are repositionable along the timeline;
generating, for display, a video display window displaying a video frame representing the media clips at a current position of a playhead in the timeline display; and
generating, for display, a transient heads-up display window overlaid on the user interface in response to pre-defined user inputs for manipulating a position of a target media clip of the media clips displayed within the user interface to change a time over which the target media clip will occur relative to the timeline, the transient heads-up display graphically depicting information representing a plurality of temporal locations within the target media clip regardless of a position within the user interface corresponding to the pre-defined user inputs; and
wherein the heads-up display window graphically depicts frames of a target video clip, of the media clips displayed within the user interface, at a plurality of temporal locations within the target video clip, and the heads-up display window visually depicting at least:
a first frame of the target video clip, wherein the first frame occurs at a first temporal location within the target video clip corresponding to a first temporal location associated with the media clip; and
a second frame of the target video clip, wherein the second frame occurs at a second temporal location within the target video corresponding to a second temporal location associated with the media clip.

17. The system of claim 16 wherein the first temporal location associated with the media dip corresponds to a current start time of the media dip on the timeline, and wherein the second temporal location associated with the media clip corresponds to a current end time of the media clip on the timeline.

18. A non-transitory computer-readable storage medium storing instructions that, when executed, are operable to cause one or more processors to perform operations comprising:
generating, for display, a timeline depicting running time associated with media clips displayed within a user interface, wherein the media clips are repositionable along the timeline;
generating, for display, a video display window displaying a video frame representing the media clips at a current position of a playhead in the timeline display; and
generating, for display, a transient heads-up display window overlaid on the user interface in response to a user input manipulating a position of a target media clip of the media clips displayed within the user interface to change a time over which the target media clip will occur relative to the timeline, the transient heads-up display graphically depicting information representing a plurality of temporal locations within the target media clip regardless of a position corresponding to the user input; and wherein the heads-up display window graphically depicts frames of a target video clip, of the media clips displayed within the user interface, at a plurality of temporal locations within the target video clip, and the heads-up display window visually depicting at least:
- a first frame of the target video clip, wherein the first frame occurs at a first temporal location within the target video clip corresponding to a first temporal location associated with the media clip; and
- a second frame of the target video clip, wherein the second frame occurs at a second temporal location within the target video clip corresponding to a second temporal location associated with the media clip.

19. The non-transitory computer-readable storage medium of claim 18 wherein the first temporal location associated with the media clip corresponds to a current start time of the media clip on the timeline, and wherein the second temporal location associated with the media clip corresponds to a current end time of the media clip on the timeline.

\* \* \* \* \*